(12) United States Patent
Correia De Pinho

(10) Patent No.: US 9,181,384 B2
(45) Date of Patent: Nov. 10, 2015

(54) PROCESS OF SYNTHESIS ASYMMETRIC POLYURETHANE BASED MEMBRANES WITH HEMOCOMPATIBILITY CHARACTERISTICS AND MEMBRANES OBTAINED BY SAID PROCESS

(75) Inventor: Maria Norberta Correia De Pinho, Lisbon (PT)

(73) Assignee: INSTITUTO SUPERIOR TECNICO, Lisbon (PT)

( * ) Notice: Subject to any disclaimer, the term of this patent is extended or adjusted under 35 U.S.C. 154(b) by 1495 days.

(21) Appl. No.: 12/439,868

(22) PCT Filed: Nov. 2, 2007

(86) PCT No.: PCT/IB2007/003340
§ 371 (c)(1),
(2), (4) Date: Nov. 3, 2009

(87) PCT Pub. No.: WO2008/041126
PCT Pub. Date: Apr. 10, 2008

(65) Prior Publication Data
US 2010/0111761 A1    May 6, 2010

(30) Foreign Application Priority Data
Sep. 4, 2006 (PT) .......................... 103560

(51) Int. Cl.
*B01D 71/54* (2006.01)
*C08G 18/40* (2006.01)
(Continued)

(52) U.S. Cl.
CPC ........ *C08G 18/4018* (2013.01); *B01D 67/0009* (2013.01); *B01D 67/0011* (2013.01);
(Continued)

(58) Field of Classification Search
CPC ...... B01D 69/00; B01D 69/12; B01D 69/125; B01D 71/00; B01D 71/06; B01D 71/54
USPC .......... 264/216, 328.2, 212, 299; 210/500.27, 210/490, 500.33
See application file for complete search history.

(56) References Cited

U.S. PATENT DOCUMENTS 3,625,871 A    12/1971  Traubel
4,284,506 A *  8/1981  Tetenbaum et al. ........ 210/321.6
(Continued)

FOREIGN PATENT DOCUMENTS

EP    0 159 783    10/1985
EP    1 043 035    4/2000
GB    1595058    10/1976

OTHER PUBLICATIONS

Haworth, W. S., The development of the Modern Oxygenator, Ann Thorac Surg, 2003, 76, S2216.
(Continued)

*Primary Examiner* — Christina Johnson
*Assistant Examiner* — Xue Liu
(74) *Attorney, Agent, or Firm* — Pearl Cohen Zedek Latzer Baratz LLP

(57) ABSTRACT

The present invention refers to polymeric membranes and its synthesis with combination of innovative characteristics at the level of the bi-soft segment polyurethane material and at the level of the structure as integral asymmetric membranes. The hemocompability properties—non-hemolytic, non-thrombogenic and no platelet adhesion—combined with the high fluxes of permeation of $O_2$ and $CO_2$ have been designed for the use of the membranes in medical equipments that involve contact with blood like extracorporeal blood oxygenators and can be further designed for hemodialysers and imunnisolation barriers.

13 Claims, 1 Drawing Sheet

(51) Int. Cl.
    *B01D 67/00*     (2006.01)
    *C08G 18/10*     (2006.01)
    *C08G 18/42*     (2006.01)

(52) U.S. Cl.
    CPC ............... B01D 71/54 (2013.01); C08G 18/10 (2013.01); C08G 18/4277 (2013.01); *B01D 2323/22* (2013.01); *B01D 2323/46* (2013.01); *B01D 2325/022* (2013.01); *B01D 2325/023* (2013.01)

(56) References Cited

U.S. PATENT DOCUMENTS

| | | |
|---|---|---|
| 4,521,504 A | 6/1985 | Sakuma et al. |
| 4,622,206 A | 11/1986 | Torgeson |
| 5,004,461 A | 4/1991 | Wilson |
| 5,128,408 A | 7/1992 | Tanaka et al. |
| 2002/0028156 A1 | 3/2002 | Anneaux et al. |

OTHER PUBLICATIONS

Leornard, R. J., The Transition from the bubble oxygenator to the microporous membrane oxygenator, Perfusion, 2003, 18, 179.

Janvier, G et al. Extracorporeal Circulation, Hemocompability, and Biomaterials, Ann Thorac Surg, 1996, 62, 1926.

Standard practices for assessment of hemolytic properties of materials: ASTM F 756-00 (ASTM, West Conshohocken, PA, USA, 2000).

Imai, Y. et al. Biomed Mater. Res. 1972, p. 573, vol. 6.

Queiroz et al. Bi-soft Segment Polyurethane Membranes: Surface Studies by X-ray Photoelectron Spectroscopy, Journal of Membrane Science, Apr. 25, 2006, p. 239-244, vol. 281 No. 1-2, Elsevier Scientific Publ. Company. Amsterdam, NL.

International Search Report for International Application No. PCT/IB2007/003340—Date of Mailing: May 9, 2008.

\* cited by examiner

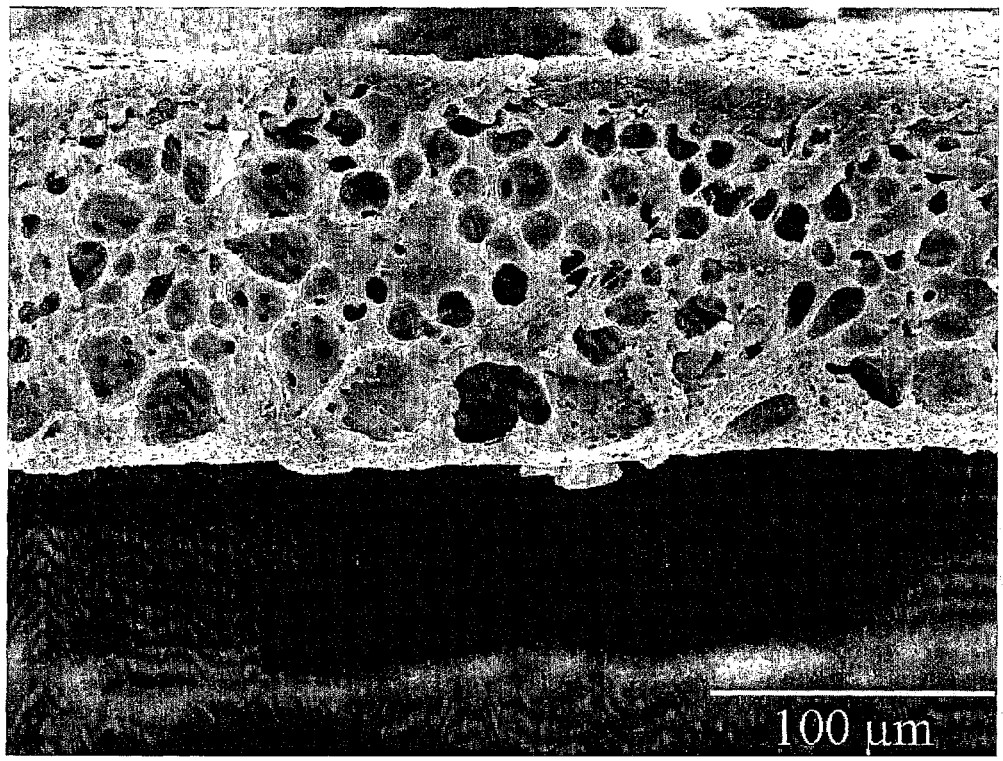

PROCESS OF SYNTHESIS ASYMMETRIC POLYURETHANE BASED MEMBRANES WITH HEMOCOMPATIBILITY CHARACTERISTICS AND MEMBRANES OBTAINED BY SAID PROCESS

CROSS-REFERENCE TO RELATED APPLICATIONS

This application is a National Phase Application of PCT International Application No. PCT/IB2007/003340, International Filing Date Nov. 2, 2007, claiming priority of Portuguese Patent Application, PT 103560, filed Sep. 4, 2006.

FIELD OF THE INVENTION

The present invention in the area of chemical and biomedical engineering it was developed at Instituto Superior Tecnico and relates to hemocompatible asymmetric polyurethane membranes to be used in extracorporeal blood oxygenators and in extracorporeal medical equipments or devices requiring the contact of blood with membranes.

BACKGROUND OF THE INVENTION

Extracorporeal blood oxygenators are medical equipments used in surgical operations like open heart surgery where lungs cannot perform their usual gas exchange function of adding oxygen to the blood and removing carbon dioxide from the blood. In 1953 the Gibbon oxygenator was used with clinical success (1). It consisted of an ensemble of vertical metallic screens where the blood circulated adjacently in the downward direction. This ensemble was inserted in a chamber that allowed oxygen to be transferred to the blood and carbon dioxide to be removed from it (1).

In the next two decades this simple equipment triggered numerous developments in two main directions:

1—The bubble oxygenators—these involved the direct bubbling of oxygen through the blood with the diffusion of the oxygen from the bubbles into the bloodstream and in the opposite direction the diffusion of carbon dioxide from the blood into the bubbles.

2—The membrane oxygenators—they incorporated a semipermeable membrane that was interposed between the bloodstream and the gas phase and therefore allowing at a controlled rate the permeation of oxygen into the blood and the passage of carbon dioxide from the blood into the oxygen stream.

In the first ones, the subsequent separation of bubbles and foams was necessary as they presented the risk of damaging the red blood cells. In association with this drawback their use was limited to surgeries involving short times of a few hours. Despite that the use of bubble oxygenators continued till 1980 when they were to a great extent substituted by the membrane oxygenators.

These allowed the support of patients during longer surgery times. They are currently designated by the abbreviation "ECMO" (extracorporeal membrane oxygenator).

Although the ECMO represented a great advancement in decreasing the risks of blood damage and allowing longer times of surgery support they were in the years 1980 still associated to several problems:
- the fluxes of oxygen transfer where still lower than the bubble oxygenators;
- the costs where high;
- there were higher risks of failure due to leakages;
- they required higher blood volumes.

These problems have successfully being solved, firstly with the integration of the membrane module with the reservoir of venous blood and then with the incorporation of the improvements made on the manufacture of other extracorporeal equipments like the ones of hemodialysis were leakages where controlled, robustness improved and costs decreased.

However the challenges in the development of membrane blood oxygenators are not only posed at the level of the membrane configurations of flat sheet and hollow fibers modules but mainly at the level of development of new membranes associating properties of hemocompability and higher oxygen permeation rates.

The hollow fiber modules of most of the ECMO in use are frequently made of microporous membranes due to the fact that they are characterized by high gas permeation rates.

However despite the fact that the pores of the microporous membranes are of sufficiently reduced sizes to avoid the passage of the blood components like the red blood cells or the platelets, they are prone to severe fouling caused by adsorption of plasma proteins that leads to the activation of the coagulation cascade, formation of trombin, platelet adhesion and formation of thrombi. This means therefore that these membranes do not have hemocompability. In very general terms a membrane that is hemocompatible does not introduce by contact with blood in circulation any alteration of the blood and particularly does not induce hemolysis, thrombogenicity and platelet adhesion through the activation of the coagulation cascade.

In accordance with British patent GB 1595058 another problem associated with microporous membranes is the passage of water to the gas compartment and the dissolution of carbon dioxide and subsequent decrease of concentration gradients and of the gas permeation rates to values below the average value in the human lungs. The authors of the patent GB 1595058 use a pulsed flux to maintain higher mass transfer rates.

One form to overcome these problems is through the coating of the membranes or through the use of composite membranes as described in U.S. Pat. No. 4,622,206 and US 2002/0028156A1 respectively.

The patent EP1043035A1 mentions another problem connected to microporous membranes which is related to the fact that along the operation time there is occurrence of the intrusion of plasma to the oxygen side and this renders the oxygenator inoperational. The author of this patent EP 1043035A1 refers that this problem can be minimized through the use of a coating that although does not cover some of the very small pores it delays the period of time that the intrusion of plasma can lead to the non-operation of the oxygenator.

Janvier et al. (3) mention that in a membrane of vinyl chloride having local roughness areas of the order of 9 µm, the platelet adhesion was multiplied by a factor of 3 when compared to a membrane with a smooth external surface.

Homogeneous dense membranes either in the form of flat sheets or hollow fibers, may play an important role in the improvement of hemocompability due to the fact that in contrast with the microporous membranes, they display a surface morphology that assures a smoother membrane/blood interface. However, the dense membranes usually present low gas permeation rates that can be lower than the physiological levels required and therefore to meet the necessary oxygenation rate, the membrane surface area of the oxygenator should be increased. And this larger blood/membrane interface may lead to higher risks of blood damage.

Also, the development of non-thrombogenic polymers like the ones reported in the U.S. Pat. Nos. 5,004,461 and 4,521, 564 can only be an asset in the solution of these problems if they prove to have film-forming properties and enable the formation of membranes with adequate flux permeate rates and with surface morphologies that associate adequate properties of hemocompatibility.

At present, the clinical use of extracorporeal membrane blood oxygenators and hemodyalizers is always associated to administration of heparin to the patient. This assures that the contact of blood with the membranes and with the equipments does not trigger thrombogenic effects, platelet adhesion and activation of the coagulation cascade. Although there are also reports claiming the minimization of these effects through the additional coating with heparin of the membranes and of the equipment surfaces, Janvier G. et al. (3) refers on the contrary, the occurrence of negative interactions with the systemic heparin.

BRIEF DESCRIPTION OF THE DRAWING

FIG. 1 shows a cross section of an Integral Asymmetric Membrane.

DESCRIPTION OF THE INVENTION

The present invention relates to a novel membrane that combines adequate properties of gas permeation and hemocompatibility for use in extracorporeal blood oxygenators.

The membranes are designed to allow permeation rates of oxygen and carbon dioxide that meet the physiological requirements with adequate membrane surface areas.

The development of the new polymeric material is an asset on the innovative tailoring of the morphology of the membrane surface in contact with blood and of the asymmetric cross-sectional membrane structure.

This combination of diffusion material properties and membrane structures allow the association of the required gas permeation rates with properties of hemocompatibility in terms of being non-hemolytic, non-thrombogenic and not displaying platelet adhesion.

The material and structural characteristics of the membranes are the outcome of combining in an innovative single step a catalytic reaction of homogeneous phase polymerization with the formation of a polymer solution with physicochemical characteristics that allow through the optimization of the casting conditions, the fabrication of integral asymmetric membrane structures (FIG. 1).

The traditional integral asymmetric membranes are associated to the Loeb-Sourirajan phase—inversion technique which essentially is a physical process of deposition/casting of a polymeric solution.

In the present invention the chemical process of polymerization which is carried out in homogeneous phase is essential in the definition of the structure of the polymer, the polymer/solvent system interactions and therefore in the final structure of the polymer solution that acts as a precursor of the structure of the casted membranes.

The polymerization reagents are two pre-polymers: one of them having three terminal functional groups of isocyanate and the other having two terminal hydroxyl groups. This last pre-polymer can be selected among glycols, lactones and carbohydrates and this plays a crucial role in relation to the membranes hemocompatibility properties.

The reaction between the two pre-polymers yielding polyurethanes with two soft segments is carried out in a homogeneous phase of a mixture of solvents that may influence the preferential migration to the surface of soft segments that improve hemocompatibility.

The solvents are selected not only in accordance with the pre-polymers compatibility but also in relation to the requirement of having very different boiling points and volatilities. This is crucial to control the evaporation rate of the more volatile solvent and determines:

1) the thickness of the dense layer of the integral asymmetric membranes;
2) the low surface roughness of the face of the dense layer that will be in contact with the blood in circulation.

The point 1) makes possible the creation of the very thin dense layers of the integral asymmetric membranes that are responsible for the augmentation of the diffusive fluxes of the gases through the membranes. In fact, the fluxes can be increased by an order of magnitude when compared to the ones of a dense symmetric membrane.

The point 2) relates to the external surface face of the dense layer that is characterized for being very smooth and not presenting roughness that could induce shear stresses to the blood in circulation.

In summary, the membranes of the present invention are associated to a simple fabrication process that does not involve the activation either by irradiation or chemically of the surface in contact with blood, as it is required in the grafting of anti-thrombogenic groups to render the membranes hemocompatible.

The present membranes associate to the hemocompatibility properties the compatibility of having high permeation rates of $O_2$ and $CO_2$.

Thus, the first object of the invention is the process of synthesis of hemocompatible polymeric membranes, comprising the simultaneous synthesis of a new polyurethane based polymer and a casting polymer solution precursor of asymmetric membranes in accordance with the following steps:

a) catalytic reaction between two pre-polymers dissolved in a mixture of two solvents with different volatilities;
b) controlled evaporation of the above solution after its spreading in the form of a film;
c) extraction of the less volatile solvent by exchange with a non-solvent;
d) extraction of the catalyst and the residual solvents by immersion of the film in water or aqueous solutions; and
e) drying.

In said process, preferably, the polyurethane based polymer is synthesized from a reaction between a pre-polymer with three terminal isocyanate (NCO) groups (PP NCO) and a pre-polymer with two terminal hydroxyl (OH) groups (PP OH) and with simultaneous formation of a casting solution.

Usually, the pre-polymer PP NCO has molecular weights in the range from 2800 to 4500 Dalton and the pre-polymer PP OH in the range from 400 to 2500 Dalton.

Said process comprises, normally, a reactive mixture of two solvents, a few (2 or 3) drops of catalyst and the two pre-polymers with a total concentration in the range from 30 to 45% (p/p). Generally, the two pre-polymers are in relative proportions from 85 PP NCO/15 PP OH to 95 PP NCO/5 PP OH expressed as a weight percentage.

The preferred pre-polymer PP OH is selected from the chemical family of lactones, glycols and carbohydrates.

Normally, in the process of the invention, the mixture of the solvents—solvent less volatile/solvent more volatile—is in the ranges from 75% p/p/25% p/p to 95% p/p/5% p/p, respectively.

Preferably the duration of the reaction is of one to two hours in accordance with the composition of the reaction mixture.

The final polymeric solution is normally cast in the form of a film over a smooth surface, with the control of the evaporation time in the range from 30 s to 100 s.

Preferably, the solvent and the catalyst impregnating the membrane are extracted and exchanged by means of a bath of water or aqueous solutions at a temperature range from 20 to 25° C.

The membranes obtained according to the process of the invention are hemocompatible, non-hemolytic and non-thrombogenic membranes and permeable to oxygen and carbon dioxide.

It is a second object of the invention a polyurethane hemocompatible integral asymmetric membranes, which has an integral asymmetric structure that displays:

a) a very thin dense layer with thickness ranging from 0.1 to 1 µm, with the external side of this dense polymer layer, which will be the one in contact with the blood, being very smooth;

b) subjacent porous layer with thickness of around 100 µm, the external side of this layer being the one in contact with the oxygen permeating through the membrane.

Preferably, in said membranes, the external side of the dense layer has average pore sizes below 1 nm (nanometer), avoiding protein adsorption and inhibiting the formation of thrombi.

The permeation of oxygen and carbon dioxide through the dense layer is generally associated to a diffusion mechanism.

The layer subjacent to the dense layer has, usually, a porous structure that does not offer significant resistance to gas permeation, namely oxygen and carbon dioxide permeation.

These membranes have application in medical equipment, such as extracorporeal membrane blood oxygenators and other equipment involving membrane/blood contact, and as immunoisolation barriers in cellular therapy and in other industries such as the pharmaceutical and food industries.

EXAMPLES

Example 1

A polymerization reaction is carried out in a reactional mixture composed of two pre-polymers, two solvents and a few drops (2-3) of a catalyst—Stannous Octoate.

The percentage of the mixture of the two pre-polymers is 40% p/p and the one of the solvents is 60% p/p.

The pre-polymers, poly(propylene oxide) and poly(caprolactone) diol are in the proportion of 90:10, respectively.

The mixture of solvents, dimethylformamide and diethyl ether are in the proportion of 55% p/p and 5% p/p, respectively.

The mixture of pre-polymers, solvents and catalyst is agitated and made homogeneous and the reaction is then carried out under an inert atmosphere of nitrogen for two hours.

Membrane Formation

The polymeric solution above described is spread with a calibrated knife of 250 µm over a glass plate very well clean and fat-free. After an exposition to air during one minute the plate is immersed in water at room temperature during 24 hours.

The membranes formed are then detached from the glass plate and taken to a oven to dry.

The membranes are then tested to the permeation to gases and present permeabilities to $O_2$ of 17.6 barrer and to $CO_2$ of 183.2 barrer which are higher than the ones of dense membranes.

The standard test ASTM F-756 (4) for hemolysis determines for these membranes an index of hemolysis (HI)—HI<2—which means that these membranes are non-hemolytic.

The thrombosis test is carried out upon the method of Imai and Nose (5) and for times of contact of the membranes with blood of ten minutes there is no observation of formation of thrombi.

For times higher than 10 min the percentage of formation of thrombi is much lower than the one corresponding to the existing results till the moment.

Example 2

The description of example one was followed with the exception than now in the mixture of the solvents there is 45% p/p of dimethylformamide and 15% p/p of diethyl ether.

The time of exposure to air is now of 30 seconds.

These membranes were tested to gas permeation and the permeabilities to $O_2$ and to $CO_2$ are respectively of 32.5 and 225.3 barrer.

The results of hemocompatibility are identical with no hemolysis and no thrombogenicity at 10 min.

The invention claimed is:

1. A process for synthesizing an integral asymmetric polyurethane membrane comprising:

a) polymerizing a first pre-polymer and a second pre-polymer, dissolved in a mixture of a first solvent, a second solvent and a catalyst, thereby providing a solution of a polyurethane;

b) casting the solution, thereby providing a cast solution;

c) evaporating the cast solution for a time period between about 30 to 100 seconds, thereby initiating formation of a first polymer layer having a cross-section with a thickness ranging from about 0.1 to 1 µm;

d) extracting the first solvent by exchange with a non-solvent, thereby providing an integral asymmetric polyurethane membrane comprising the first polymer layer and a second polymer layer having a cross-section thickness of around 100 µm;

e) immersing the integral asymmetric polyurethane membrane in water or an aqueous solution, thereby removing residual catalyst and solvents; and f) drying the integral asymmetric polyurethane membrane wherein the second solvent evaporates before the first solvent.

2. The process according to claim 1, wherein the polymerizing is carried out in a homogeneous reaction mixture.

3. The process according to claim 1, wherein the first pre-polymer has molecular weight in a range from 2800 to 4500 Dalton and at least three terminal isocyanate (NCO) groups.

4. The process according to claim 1, wherein the second pre-polymer is a lactone or a carbohydrate, has molecular weight in a range from 400 to 2500 Dalton and at least two terminal hydroxyl (OH) groups.

5. The process according to claim 1, wherein the solution of step (b) is cast over a smooth surface.

6. The process according to claim 1, wherein the first polymer layer has an average pore size below about 1 nm.

7. The process according to claim 1, wherein oxygen and carbon dioxide permeate through the first polymer layer via diffusion.

8. The process according to claim 1, wherein the second polymer layer allows free gas permeation.

9. The process according to claim 1, wherein the integral asymmetric polyurethane membrane is immersed in water or an aqueous solution at a temperature in a range of about 20 to 25° C.

10. The process according to claim 1, wherein the polymerizing is performed for about one to two hours.

11. The process according to claim 1, wherein the first and second pre-polymers are present in proportions of about 85:15 to 95:5% w/w.

12. The process according to claim 1, wherein the first solvent and the second solvent are present in proportions of about 75:25 to 95:5%w/w.

13. The process according to claim 1, wherein the first polymer layer has a smooth external surface.

* * * * *